United States Patent [19]

Friday

[11] 4,269,021
[45] May 26, 1981

[54] FRUIT AND NUT HARVESTING APPARATUS

[75] Inventor: Philip L. Friday, Hartford Township, Van Buren County, Mich.

[73] Assignee: Friday Tractor Co., Inc., Hartford, Mich.

[21] Appl. No.: 26,300

[22] Filed: Apr. 2, 1979

[51] Int. Cl.³ ............................................. A01G 19/06
[52] U.S. Cl. ........................................................ 56/329
[58] Field of Search ............... 56/329, 328 R, 328 TS; 52/3, 4, 63; 160/262; 273/27; 4/172.12

[56] References Cited

U.S. PATENT DOCUMENTS

| | | | |
|---|---|---|---|
| 1,385,131 | 7/1921 | Horn | 160/262 |
| 3,407,582 | 10/1968 | Poehlmann | 56/329 |
| 3,430,425 | 3/1969 | Pool et al. | 56/329 |
| 3,541,773 | 11/1970 | Cate | 56/329 |
| 3,706,187 | 12/1972 | Toet | 56/329 |

FOREIGN PATENT DOCUMENTS 2238419 2/1975 France ...................................... 56/329

Primary Examiner—Robert A. Hafer
Attorney, Agent, or Firm—Blanchard, Flynn, Thiel, Boutell & Tanis

[57] ABSTRACT

A catching frame for a fruit and nut harvesting apparatus comprising a pair of sheets which can be rolled up on rolls and which can be unrolled and simultaneously moved angularly into encircling relationship to a tree trunk underlying the branches of the tree for catching fruit dislodged from the tree.

19 Claims, 6 Drawing Figures

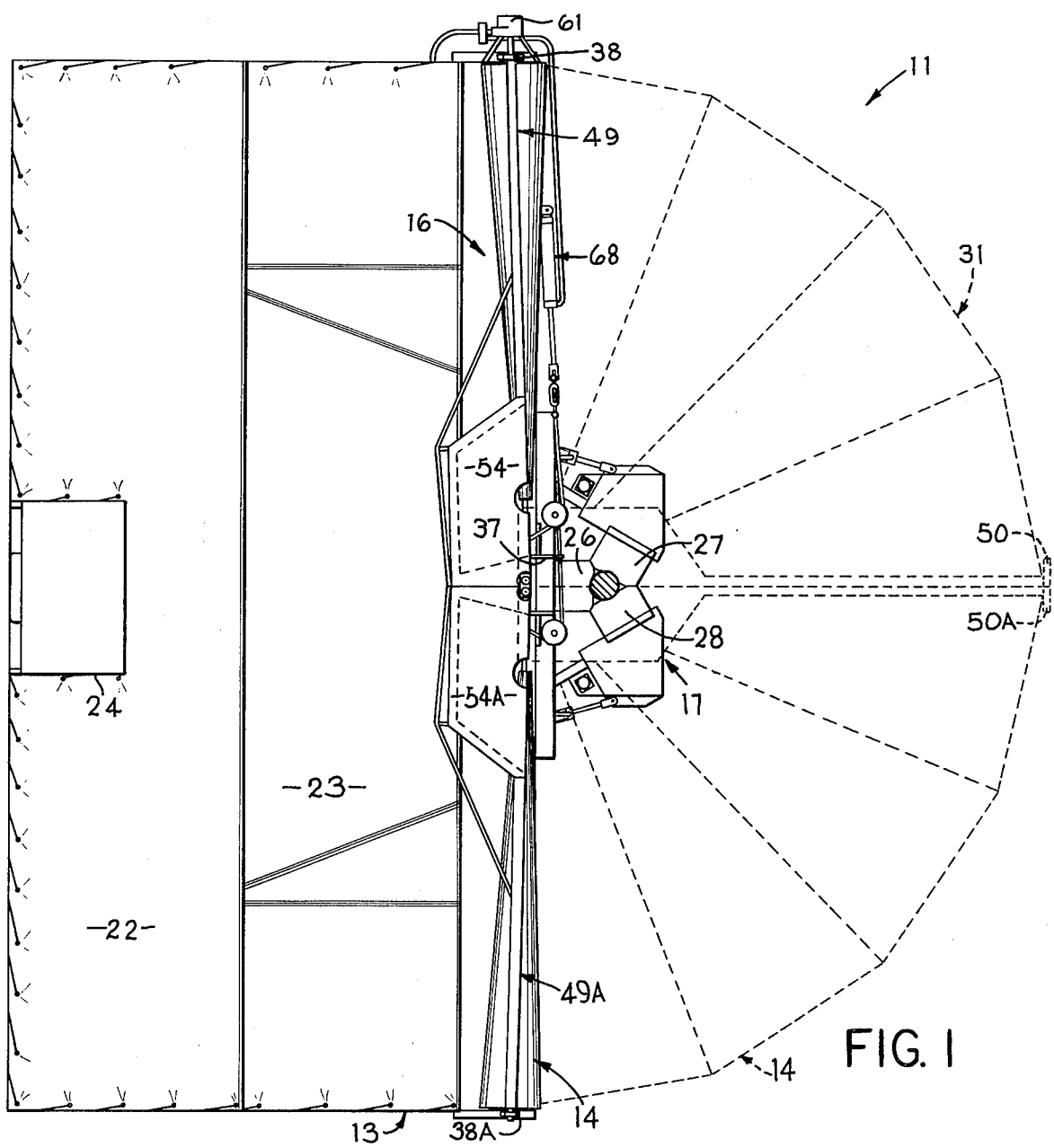
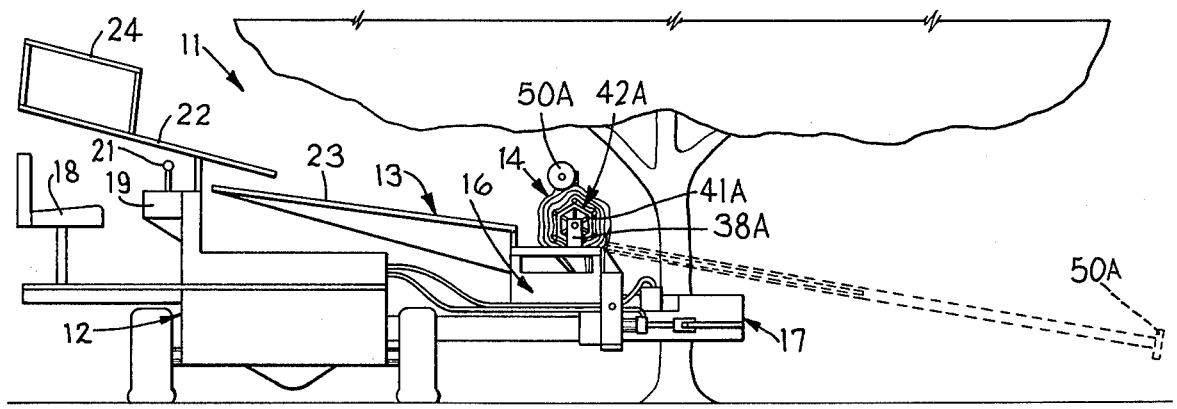
FIG. 1
FIG. 2

FRUIT AND NUT HARVESTING APPARATUS

This invention relates to an improved apparatus for catching fruits and nuts shaken from trees and conveying them to collecting receptacles. This type of apparatus is commonly referred to as a catching frame and that term will be frequently used in the following description.

Fruit and nut harvesting machines comprise a tree shaker for shaking the trunks or limbs of trees to dislodge fruit therefrom and some kind of device for catching the falling fruit. Fruit catchers commonly comprise inclined, generally planar, flexible sheets suspended on frames. In one commonly used fruit catcher, two separate frames are used, each of which is adapted to catch fruit from one-half of a tree. These two frames are separately moved about in the orchard by means of tractors. In use, the two frames are located in cooperative relationship so as to define a shallow V shape channel underlying the entirety of the tree to catch the fruit shaken therefrom. The fruit rolls down the inclined sheets and is collected in a conveyor located at the center of the V. A crew of at least two persons is needed to operate this type of fruit catcher. In another type of fruit catcher, there is used a frametype catcher mounted on a tractor and having an inclined, generally planar, flexible sheet adapted for catching fruit from approximately one-half of the tree. On this catcher is mounted a roll comprised of two sections of flexible fabric. The fabric sections can be unrolled, on opposite sides of the tree trunk, and placed on the ground to form a carpet thereon. The fruit falls on the carpet and then the carpet is rolled up to move the fruit into a conveyor mounted on the inner side of the frame. It is necessary to manually hold and lift the carpet during unrolling and rolling up. Thus, a crew of at least two persons, usually three persons, is needed to operate this machine. See U.S. Pat. No. 3,511,039 which illustrates a machine of this type.

It is desired to provide a fruit harvester which can be operated by one person and in which all of the parts of the harvester can be operated by a single operator from a position on the tractor. There have been developed in the art fruit harvesters in which the shaker mechanism, the conveyor and the elevator can be operated by one person. But the catching frames previously suggested for this purpose have not been satisfactory. There have been proposed a variety of catching frames constructed so that the fabric is capable of being moved from the folded position located on one side of a tree trunk to an unfolded position encircling the tree trunk, so that in the unfolded position the fruit shaken from the tree can be caught on the fabric and directed to a conveyor. Such prior art catching frames have been costly to build and expensive to maintain. They are cumbersome and slow in operation. U.S. Pat. Nos. 3,407,582 and 3,596,455 disclose representative apparatuses of this type.

It is an object of this invention to provide an improved fruit harvesting apparatus comprising an improved catching frame, the apparatus being a single integrated unit adapted to be driven along a row of trees in an orchard so that fruit can be shaken off the trees and collected rapidly.

Another object of the invention is to provide an improved fruit harvesting apparatus, as aforesaid, in which one operator can perform all of the required operations necessary to shake, catch and collect the fruit.

Another object of the invention is to provide an improved fruit harvesting apparatus, as aforesaid, which employs extendable sheets to catch fruit from about one-half of the tree and wherein the mechanism for extending the fabric is relatively simple, durable and inexpensive.

Other objects and advantages of the invention will become apparent from a reading of the following description and an inspection of the accompanying drawings.

BRIEF DESCRIPTION OF THE DRAWINGS

FIG. 1 is a plan view of the harvesting apparatus according to the invention wherein the unfolded position of the sheets is shown in broken lines.

FIG. 2 is an end view of the harvesting apparatus.

SUMMARY OF THE INVENTION

Figure 3:
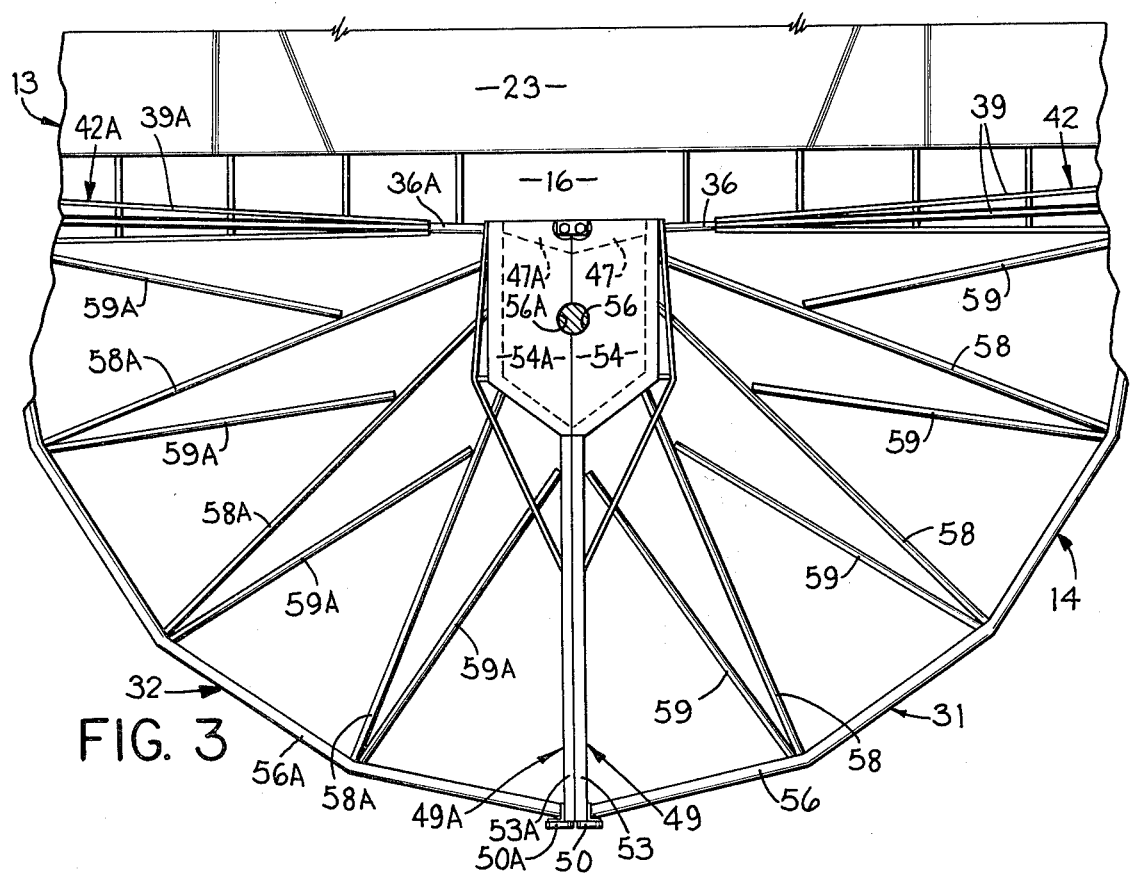
FIG. 3 is a plan view of the central portion of the harvesting apparatus with the fabric in unfolded position.

The invention provides an improved catching frame for a fruit harvester. In particular, the catching frame comprises an extendable catching frame section comprising two quadrant-shaped sheets. The sheets can be rolled up on rolls whose widths progressively increase toward the axially outer ends thereof. Pivoted, elongated, support members are attached to sheets so that the sheets can be unrolled and simultaneously moved angularly so that the sheets can cooperate to form a generally semicircular surface for catching fruit dislodged from the tree.

Referring to the drawings, the fruit harvester 11 comprises a tractor 12, a fixed catching frame section 13, an extendable catching frame section 14, a conveyor 16 located at the juncture of the two catching frame sections and a trunk shaker mechanism 17.

The tractor 12 has an operator's seat 18 and a control panel 19 containing valves controlled by levers 21 for operating the various fluid pressure operated mechanisms of the harvester. The fixed catching frame section 13 is comprised of a suitable metal framework mounted on the tractor and supporting a fabric cover for catching the fruit. The fixed catching frame section has an upper inclined wall portion 22 and a lower inclined wall portion 23, both of which are inclined downwardly toward the conveyor 16 so that fruit falling thereon rolls downwardly therealong and falls into the conveyor. In the upper wall portion 22 above the operator's seat 18, there is provided an upwardly projecting framework 24 covered by a fabric, but which permits the operator to view the progress of the shaking operation. The fabric cover covers the entirety of the tractor so that fruit does not fall onto the tractor. The fabric cover is of sufficient width and length that it underlies the entirety of approximately one-half of the tree so that the fruit shaken therefrom will fall on the fabric and will be directed into the conveyor.

As thus far described, the fruit harvesting apparatus is of a conventional construction.

The trunk shaker mechanism 17 illustrated in the drawings is the same as that described and claimed in my application Ser. No. 26,245, filed Apr. 2, 1979 entitled "Tree Shaking Apparatus," the entire contents of which are incorporated herein by reference. However, it is to be understood that any conventional trunk shaker mechanism can be used in the present invention.

The disclosed trunk shaker mechanism 17 comprises a fixed jaw 26 and two pivotally mounted jaws 27 and 28 which can encircle a tree trunk and impart vibration thereto to dislodge fruit from the tree. The trunk shaker mechanism 17 can be moved laterally relative to the tree between a remote position in which it is located sidewardly outwardly from the tree trunk and an adjacent position (shown in the drawings) wherein it can engage and shake the tree trunk.

The conveyor 16 is comprised of an upwardly open channel having an endless conveyor belt movable along the bottom wall thereof, the belt having upstanding pusher bars 29 at spaced intervals therealong so that the fruit is moved to one end of the conveyor. The fruit can then be discharged into an elevator (not shown) and thence into collecting receptacles, as shown, for example, in U.S. Pat. No. 3,541,773.

The invention is particularly directed to the extendable catching frame section 14 which will now be described. In general, the extendable catching frame section 14 is comprised of two quadrant-shaped fabrics or sheets 31 and 32 each adapted to underlie one quarter of the tree and which cooperate to define a substantially semicircular catching frame section extending from the conveyor 16 over the shaker mechanism 17 and underlying the tree for catching fruit dislodged therefrom. The structures for mounting the quadrant-shaped fabrics are the same. Accordingly, only the structure associated with the quadrant-shaped fabric 31 will be described in detail. Corresponding parts of the structure supporting the other quadrant-shaped fabric 32 will be identified by the same reference numerals to which the suffix A is added.

A shaft 36 is rotatably supported, adjacent its inner end, by a bracket 37 mounted adjacent to the front wall of the conveyor 16 at about the longitudinal midpoint of the conveyor. The shaft 36 extends longitudinally of the conveyor 16 and is inclined at a small angle to the conveyor both in the horizontal direction and in the vertical direction. The outer end of the shaft 36 is rotatably supported in a bracket 38 mounted on the end of the conveyor. A plurality of spaced-apart rods 39, here six rods 39, are arranged at uniform spacings around the shaft 36. The inner ends of the rods 39 are fixedly secured to the shaft 36 at a position adjacent to but spaced a small distance outwardly from the inner end of the shaft. The rods 39 extend lengthwise along the shaft 36 and they diverge outwardly from the shaft 36 in the axially outward direction. The axially outer ends of the rods 39 are affixed to the axially outer end of the shaft 36, adjacent bracket 38, by means of radially extending bars 41. The shaft 36 and bars 39 define a rotatable framework or roll 42 of continuously progressively increasing cross-sectional size toward the outer end thereof. It will be apparent that the rods 39 can be replaced by a conical tube, if desired. The framework 42 provides a support on which the quadrant-shaped fabric can be rolled up as further described hereinbelow.

The adjacent inner ends of the shafts 36 and 36A are connected to each other by a universal joint 43 for conjoint rotation.

The inner, radially extending edge of the quadrant-shaped fabric 31 is affixed to the framework 42 along the entire length of said edge.

Figure 5:
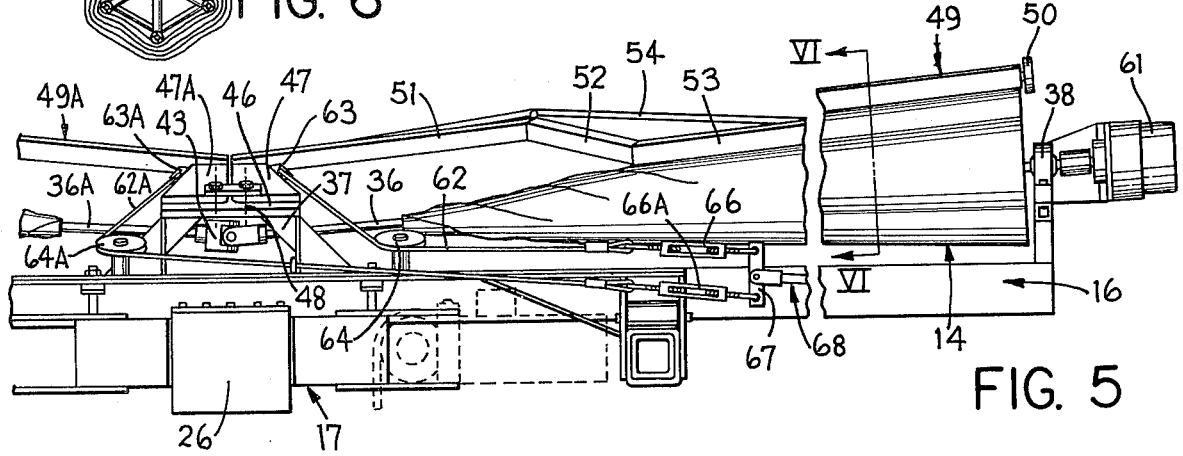
FIG. 5 is a front view of the apparatus as shown in FIG. 4, but with the pads 54,54A omitted.

A mounting plate 46 is affixed to the upper ends of and extends between the brackets 37. The mounting plate 46 is located above and extends transversely across the upper side of the conveyor. The mounting plate 46 is inclined upwardly at a small angle relative to the horizontal as shown in FIG. 5. The upper surface of the mounting plate 46 is copiously lubricated. A pivot plate 47 is supported on mounting plate 46 for pivotal movement about a pivot axis 48. An elongated structural member 49 is affixed to the outer edge of pivot plate 47. The structural member 49 comprises a straight inner section 51, an inclined intermediate section 52 and a straight outer section 53 which extends to the perimeter of the quadrant-shaped fabric. The inner section 51 is parallel with the outer section 53 and is offset laterally outwardly therefrom. A brace 54 is secured to the sections 51 and 53. A ground-engaging roller 50 is mounted on the outer end of member 49.

Figure 4:
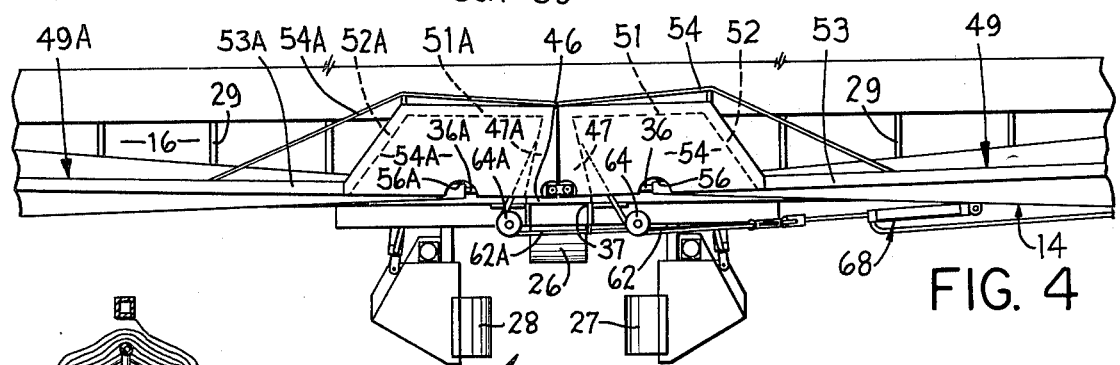
FIG. 4 is a view like FIG. 3, with the fabric in a rolled-up condition.

The arrangement of sections 51, 52 and 53 of member 49 and the corresponding sections of member 49A insure that the outer sections 53,53A can be brought into substantially abutting contact in the unfolded condition of the quadrant-shaped fabrics, as shown in FIG. 3, wherein said outer sections extend laterally away from the tree trunk, whereas in the rolled-up condition of the quadrant-shaped fabric, the end portions extend away from each other in substantial vertical alignment with and above the shafts 36,36A, as shown in FIG. 4. The sections 51,51A,52,52A encircle the tree trunk on three sides thereof. Elastomeric pads 54,54A overlie the sections 51,52 and 51A,52A respectively and cover the space therebetween in the unrolled position (FIG. 3) so that fruit that drops thereon will not fall to the ground. The pads 54,54A have substantially semicircular recesses 56,56A in their mating edges to define an opening through which extends the tree trunk.

In the rolled-up condition of the quadrant-shaped fabrics, the outer sections 53,53A of members 49,49A are inclined upwardly in the outer direction at a larger angle than the angle of inclination of shafts 36,36A.

Figure 6:
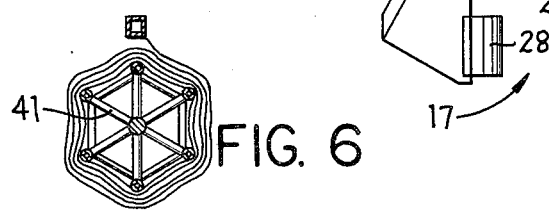
FIG. 6 is a sectional view taken along the line VI—VI in FIG. 5.

The outer radial edges of the quadrant-shaped fabrics 31 and 32 are affixed to the sections 53,53A of the members 49,49A, respectively. Thus, rotation of shafts 36 and 36A, and simultaneous pivotal movement of members 49,49A from the extended position (FIG. 3) thereof to the retracted position (FIG. 5) thereof will effect rolling up of the quadrant-shaped fabrics 31 and 32 on the frameworks 42,42A, and in the fully rolled-up position the sections 53,53A will extend lengthwise along the upper side of the rolled-up fabrics. Pivotal movement of the members 49,49A in the opposite direction will unroll the fabrics. In moving to the position in which the fabrics are unrolled, the members 49 will move from the upwardly inclined positions shown in FIG. 5 to a downwardly inclined position as shown in FIG. 2 in broken lines. Thus, in the unrolled position the quadrant-shaped fabrics are inclined downwardly at a small angle relative to the horizontal. Further, in rolling up the fabric the shaft 36 is rotated clockwise, as appearing in FIG. 6, so that the fabric passes over the upper side of the framework 42 so that the fruit is likewise carried over the upper side of the framework and is discharged into the conveyor as the fabric begins to move downwardly.

The quadrant-shaped fabrics 31 and 32 have an upstanding edge 56 on the perimeter thereof, a plurality of substantially radially extending stiffeners 58 and a plurality of upstanding elongated projections 59 which extend from the perimeter of the fabric toward the member 49. The upstanding edge 56 and the upstanding projections 59 are preferably made of resiliently compressible and flexible members such as elastomeric foam, whereas the stiffeners 58 are made of relatively stiff though somewhat flexible members, such as small diameter poles made of fiberglass bonded with resin. The edge 56, the stiffeners 58 and the projections 59 are sewn into the fabric. The fabric has been omitted from FIG. 3 to show the structure more clearly. The edge 56 prevents the fruit from falling off the perimeter of the fabric. The projections 59 serve as stops to limit rolling of the fruit on the fabric and during winding up of the fabric they act as pushers to push the fruit toward the conveyor. Because the edge 56 and projections 59 are resiliently compressible and flexible members they will spirally wind around the framework 42 with the fabric. On the other hand, the stiffeners will prevent excessive sagging of the fabric. They will be wound up on the framework 42 so as to extend lengthwise thereof.

The mechanism for winding up the fabrics comprises a rotary hydraulic motor 61 connected to the outer end of the shaft 36. Supply of pressure fluid to the motor 61 will effect rotation of the shaft 36 and thereby the shaft 36A so that the quadrant-shaped fabrics 31 and 32 will be rolled up on the frameworks 42 and 42A, i.e., clockwise in FIG. 6.

A cable 62 is connected at one end thereof to a cable anchor 63 attached to pivot plate 47. The cable 62 passes around a guide pulley 64 and extends lengthwise along the conveyor. The cable 62A is similarly constructed and arranged. The cables 62,62A are connected by turnbuckles 66,66A to a plate 67 which is pivotally mounted on the end of the piston of a double-acting piston and cylinder assembly 68. Thus, supply of pressure fluid to the leftward end of the cylinder of assembly 68 will be effective to pivot the pivot plates 47,47A and thereby the structural members 49,49A from the rolled-up position shown in FIG. 4 to the unrolled position shown in FIG. 3.

The tractor 12 carries a main pressure pump which suitably pressurizes a pressure fluid, particularly a hydraulic fluid, as supplied to the pump from a reservoir. The flow of pressurized fluid from the pump to various fluid pressure operated devices on the harvester is controlled by manually movable levers 21 on the control panel 19. The operation of the extendable catching frame sections involves supplying pressurized fluid to the motor 61 and to the piston and cylinder assembly 68. It will be understood that when pressure fluid is supplied to motor 61 to roll up the fabrics, a small pressure can be applied to assembly 68 to yieldably resist the rolling up of the fabric in order to maintain the fabric taut during the rolling up. Similarly when pressure fluid is supplied to assembly 68 to unroll the fabric, a small resistance pressure can be applied on the motor 61, if necessary, to yieldably resist unrolling to maintain the fabric taut during unrolling.

OPERATION

Although the operation of the apparatus has been indicated above, the following brief summary is offered to insure a complete understanding of the invention.

The entirety of the fruit harvester is mounted on the tractor 12 so that it can be driven down a row of trees in an orchard. At this time the quadrant-shaped fabrics 31 and 32 are rolled up and the trunk shaker mechanism 17 is retracted. The operator will stop the tractor at a position whereat the fixed catching frame section 13 and the conveyor 16 are positioned as shown in FIG. 1. The trunk shaker mechanism 17 is located in lateral alignment with the tree trunk. The trunk shaker mechanism 17 is then moved laterally and its jaws are moved into clamped engagement with the tree trunk. The quadrant-shaped fabrics will be unrolled by supplying pressure fluid to the cylinder of piston and cylinder assembly 68. The piston of the assembly 68 will be moved rightwardly so as to pull the cables 62 and 62A and thereby pivot the pivot plates 47 and 47A and thereby the members 49 and 49A from the position shown in FIG. 4 to the position shown in FIG. 3. This causes the fabrics 31 and 32 to be unrolled. Unrolling of the fabrics is assisted by gravity because of the inclination of the mounting plate 46 whereby during unrolling the members 49 and 49A move through an arcuate path which is inclined downwardly relative to the horizontal.

When the catching frame section 14 is in the unrolled catching position, the vibration mechanism of the trunk shaker will be operated thereby to shake the tree and dislodge fruit therefrom. The fruit that falls on the fixed frame section 13 will roll downwardly along the fabric into the conveyor 16, owing to the inclination of the fabric and because reaction to the vibration force applied to the tree trunk will also shake the fixed catching frame section 13 somewhat. The fruit that falls on the quadrant-shaped fabrics 31 and 32 will rest thereon. The fruit tends to collect in sagging portions of the fabric and adjacent the upstanding edge 56 and upstanding projections 59.

When shaking is completed, the jaws of the trunk shaker mechanism 17 are opened. The trunk shaker mechanism is moved laterally away from the tree trunk either at this time or after rolling up of the fabrics 31 and 32. Pressure fluid will be supplied to the motor 61, thereby to rotate the shafts 36,36A and the frameworks 42,42A in directions effective to roll up the fabrics 31 and 32 thereon. During rotation of the motor 61, by restricting discharge of fluid from the cylinder of the assembly 68 a low pressure is applied via the cables on the members 49,49A so that the fabrics are reasonably taut during rolling up. The fabrics 31 and 32 are rolled up over the tops of the frameworks 42 and 42A so that the fruit is carried up over the top of the frameworks and then is allowed to drop into the conveyor 16. The upstanding edge 56 and the projections 59 will be effective as pushers to push the fruit upwardly over the frameworks and into the conveyor 16 during rolling up of the fabrics. Since the fabric assumes a conical shape during rolling up, it is not necessary to extend the projections completely to the inner edge of the fabric.

The conveyor 16 will be operated during shaking and rolling up of the fabrics 31 and 32 whereby to move the fruit to an elevator and thence into collecting vessels.

At the end of the operation, the fabrics 31 and 32 are rolled up and the shaker mechanism 17 is retracted. The fruit harvester can then be driven to the next tree to be shaken. The fruit harvester can be operated by one person. The shaking operation can be carried out rapidly and effectively whereby the fruit can be harvested economically.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Fruit catching apparatus for receiving fruit shaken from a tree, comprising: frame means; an elongated roll rotatably mounted on said frame means, said roll being of progressively increasing size from one end to the other end thereof; a flexible, generally planar sheet which has substantially the shape of a quadrant in plan view, one radial edge of said sheet being affixed to said roll along the lengthwise extent thereof so that said sheet can be rolled up on said roll; a support member affixed to the other radial edge of said sheet; means supporting said support member on said frame means for pivotal movement about an axis substantially perpendicular to the axis of rotation of said roll and located close to said one end of said roll; said sheet having an upwardly projecting wall extending along the perimeter thereof and between the outer ends of the radial edges thereof for retaining fruit on said sheet; and a plurality of upwardly projecting pushers extending inwardly from the perimeter of said sheet at circumferentially spaced-apart locations thereon toward said other radial edge of said sheet for pushing fruit over the top of said roll during winding up of said sheet on said roll.

2. Fruit catching apparatus according to claim 1 in which said wall and said pushers are made of resiliently flexible and compressible material so that they can be rolled up on said roll with said sheet.

3. Fruit catching apparatus according to claim 2 including a series of stiffeners extending radially inwardly from the perimeter of said sheet at circumferentially spaced-apart locations thereon substantially to the inner end of said other radial edge of said sheet.

4. Fruit catching apparatus according to claim 1 including motor means for rotating said roll and actuating means for pivotally moving said support member.

5. Fruit catching apparatus for receiving fruit shaken from a tree, comprising: frame means; a pair of elongated rolls rotatably mounted on said frame means in end-to-end relationship, said rolls being of progressively increasing size from the adjacent inner ends thereof to the remote outer ends thereof; a pair of flexible, generally planar sheets each of which has substantially the shape of a quadrant in plan view, one radial edge of each of said sheets being affixed to one of said rolls along the lengthwise extent thereof so that each of said sheets can be rolled up on its associated roll; a pair of elongated support members, each of said support members being affixed to the other radial edge of one of said sheets; means pivotally supporting the inner ends of said support members on said frame means for pivotal movement about adjacent axes which are substantially perpendicular to the axes of rotation of said rolls and are located close to said adjacent inner ends of said rolls, whereby said sheets can be unrolled from said rolls by pivoting said support members and moved into positions wherein the lengthwise extents of said support members are adjacent each other and said sheets in combination define a generally semi-circular surface for receiving fruit dislodged from a tree.

6. Fruit catching apparatus according to claim 5 in which each of said sheets has an upwardly projecting wall extending along the perimeter thereof and between the outer ends of the radial edges thereof for retaining fruit on said sheet.

7. Fruit catching apparatus according to claim 6 in which each of said sheets has a plurality of upwardly projecting pushers extending inwardly from the perimeter of said sheet at circumferentially spaced-apart locations thereon toward said other radial edge of said sheet for pushing fruit over the top of its associated roll during winding up of said sheet on said roll.

8. Fruit catching apparatus according to claim 7 in which said wall and said pushers are made of resiliently flexible and compressible material so that they can be rolled up on said roll with said sheet.

9. Fruit catching apparatus according to claim 8 wherein each of said sheets has a series of stiffeners extending radially inwardly from the perimeter of said sheet at circumferentially spaced-apart locations thereon substantially to the inner end of said other radial edge of said sheet.

10. Fruit catching apparatus according to claim 5 wherein the adjacent inner ends of said rolls are connected by a universal joint, a motor connected to one of said rolls for conjointly rotating said rolls and actuating means for pivotally moving said support members.

11. Fruit catching apparatus according to claim 10 wherein said actuating means comprises a pair of cables, each of said cables being connected to one of said support members close to the inner end thereof; and a piston and cylinder assembly mounted on said frame means and connected to said cables.

12. Fruit harvesting apparatus comprising: a tractor adapted to be placed along one side of the trunk of a tree; a trunk shaker mounted on said tractor and adapted to be clamped to the trunk of the tree to shake same and dislodge fruit therefrom; elongated conveyor means mounted on said tractor and extending substantially parallel to the longitudinal axis thereof and adapted to extend along one side of the tree trunk; a fixed catching frame section mounted on and overlying said tractor and adapted to underlie about one-half of the tree, said fixed catching frame section comprising sheet means inclined downwardly toward one longitudinal side of said conveyor so that fruit falling on said fixed catching frame section rolls downwardly on said sheet means into said conveyor; an extendable catching frame section mounted on said tractor above the other longitudinal side of said conveyor, said extendable catching frame section comprising a pair of substantially quadrant-shaped flexible sheets each adapted to underlie about one-quarter of the tree; a pair of elongated rotatable rolls mounted in end-to-end relation and extending in opposite directions lengthwise of said conveyor, said rolls being of progressively increasing size from the adjacent inner ends thereof to the remote outer ends thereof, one radial edge of each of said sheets being affixed to one of said rolls along the lengthwise extent thereof so that each sheet can be rolled up on its associated roll; a pair of elongated support members, each support member being affixed to the other radial edge of one of said sheets; means pivotally supporting the inner ends of said support members for pivotal movement about adjacent axes which are substantially perpendicular to the axes of rotation of said rolls and are located close to said adjacent inner ends of said rolls; and drive means for rotating said rolls and pivoting said support members to move the sheets between a first position in which the sheets are wound up on said rolls and a second position in which said sheets are unwound from said rolls and the lengthwise extents of said support members are adjacent each other so that said sheets in combination define a semi-circular surface for receiving fruit dislodged from the tree.

13. Fruit harvesting apparatus according to claim 12 in which each of said sheets has an upwardly projecting wall extending along the perimeter thereof and between the outer ends of the radial edges thereof for retaining fruit on said sheet.

14. Fruit harvesting apparatus according to claim 13 in which each of said sheets has a plurality of upwardly projecting pushers extending inwardly from the perimeter of said sheet at circumferentially spaced-apart locations thereon toward said other radial edge of said sheet for pushing fruit over the top of its associated roll during winding up of said sheet on said roll.

15. Fruit harvesting apparatus according to claim 14 in which said wall and said pushers are made of resiliently flexible and compressible material so that they can be rolled up on said roll with said sheet.

16. Fruit harvesting apparatus according to claim 15 wherein each of said sheets has a series of stiffeners extending radially inwardly from the perimeter of said sheet at circumferentially spaced-apart locations thereon substantially to the inner end of said other radial edge of said sheet.

17. Fruit harvesting apparatus according to claim 12 wherein the adjacent inner ends of said rolls are connected by a universal joint, said drive means including a motor connected to one of said rolls for conjointly rotating said rolls and actuating means for pivotally moving said support members.

18. Fruit harvesting apparatus according to claim 17 wherein said actuating means comprises a pair of cables, each of said cables being connected to one of said support members close to the inner end thereof, and a piston and cylinder assembly connected to said cables.

19. Fruit catching apparatus for receiving fruit that has been shaken from a tree, comprising: elongated frame means having a longitudinally intermediate portion adapted to be positioned close to the trunk of a tree; elongated substantially horizontal roll means rotatably mounted on said frame means and extending longitudinally thereof, said roll means including two roll portions having adjacent inner ends of relatively small size located adjacent to said longitudinally intermediate portion of said frame means, said roll sections extending in opposite directions longitudinally of said frame means and progressively increasing in size toward the mutually remote outer ends thereof; a pair of flexible sheets each of which has substantially a quadrant shape in plan view and adapted for underlying substantially one-quarter of the tree, each of said sheets being connected to one of said roll portions so that each sheet can be rolled up on its associated roll portion; a pair of elongated support structures which are mounted on said frame means for movement between a catching position in which said support structures extend transversely to and forwardly of said frame means on opposite sides of the tree trunk and a retracted position wherein said support structures extend in opposite directions substantially longitudinally of said frame means, each of said support structures being connected to support one of said sheets so that when said sheets are unrolled from said roll sections, said support structures are disposed in said catching position and support said sheets so that said sheets in combination define a surface underlying about one-half of the tree for receiving fruit dislodged from the tree, and said support structures are moved to said retracted position when said sheets are rolled up on said roll ctions.

* * * * *